R. W. DAVIS & R. B. WILLIAMSON.
DYNAMO ELECTRIC MACHINE.
APPLICATION FILED APR. 18, 1914.
1,279,666.
Patented Sept. 24, 1918.
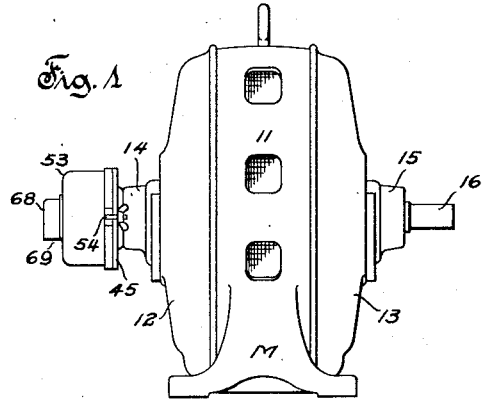
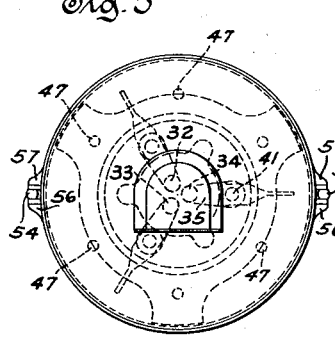
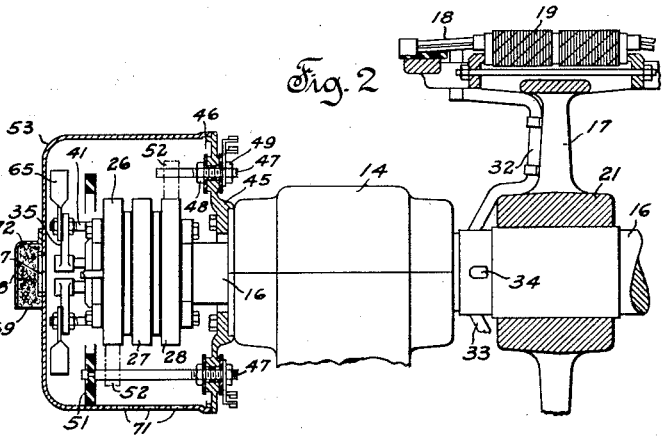
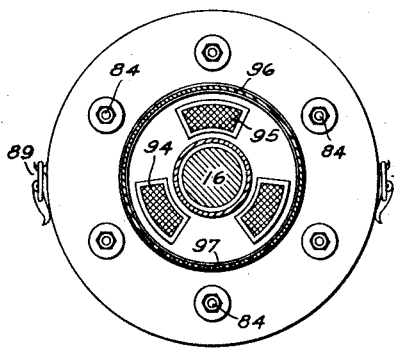
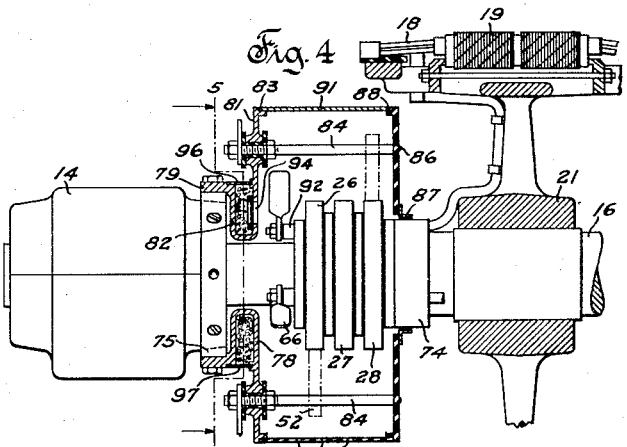
Witnesses
Rob. E. Stoll.
J. H. Kane
Inventors
R. W. Davis
R. B. Williamson
By
Attorney

UNITED STATES PATENT OFFICE.

RAE W. DAVIS, OF WEST ALLIS, AND ROBERT B. WILLIAMSON, OF MILWAUKEE, WISCONSIN, ASSIGNORS TO ALLIS-CHALMERS MANUFACTURING COMPANY, OF MILWAUKEE, WISCONSIN, A CORPORATION OF DELAWARE.

DYNAMO-ELECTRIC MACHINE.

1,279,666.  Specification of Letters Patent.  Patented Sept. 24, 1918.

Application filed April 18, 1914.  Serial No. 833,312.

*To all whom it may concern:*

Be it known that we, RAE W. DAVIS and ROBERT B. WILLIAMSON, citizens of the United States, residing at West Allis and Milwaukee, respectively, in the county of Milwaukee and State of Wisconsin, have invented certain new and useful Improvements in Dynamo-Electric Machines, of which the following is a specification.

This invention relates in general to dynamo-electric machines and has more particular relation to the provision of means for maintaining such machines in efficient operating condition.

In certain industries, as for instance the cement industry, large amounts of dust and foreign matter are held in suspension in the atmosphere, and, where dynamo-electric machines provided with current collecting devices are installed, this dust usually settles on such devices, whether the same be of the commutator or collector ring type. The settling of dust on such contact surfaces causes considerable harmful sparking and heating, thus preventing the most efficient operation of the machine. Although it is usually desirable to provide machines of fairly open construction to allow some ventilation to maintain the cores and windings in a fairly cool operating condition, dust on these parts not being a decidedly harmful factor, special protection, however, is desirable for the ordinarily exposed current collecting devices, and further, it is desirable to maintain these relatively movable contacts at a fairly low operating temperature.

It is an object of this invention to provide an improved means for protecting parts of dynamo-electric machines from dust and foreign matter and for maintaining such devices at a comparatively low operating temperature.

It is a further object of this invention to provide improved protecting means for the current collecting devices of dynamo-electric machines in which access to the current collecting devices is comparatively easy, in combination with means for maintaining such devices in cool operating condition.

It is a further object of this invention to provide in combination with a dynamo-electric machine of ordinary construction, improved means for protecting the current collecting devices of such machine from dust and foreign matter, and for maintaining such devices in cool operating condition by means of forced ventilation.

These and other objects are attained by this invention, the various novel features of which will appear from the description and drawings, disclosing one embodiment of such invention, and will be particularly pointed out in the claims.

In the accompanying drawings:

Figure 1 is a front elevation of a dynamo-electric machine of the wound-rotor induction motor type, the machine being provided with collector rings and with protective means therefor, embodying the principles of this invention.

Fig. 2 is an enlarged front elevation, partly in section, of a portion of the motor shown in Fig. 1, the collector rings of the motor being shown positioned outside of the bearing.

Fig. 3 is an end elevation of the collector ring protective device shown in Fig. 2.

Fig. 4 is a view similar to Fig. 2, of a motor of the type in which the collector rings are positioned between the rotor core and the bearing.

Fig. 5 is a section on the line 5—5 of Fig. 4.

As shown in Figs. 1, 2 and 3, an induction motor M comprising a frame 11 and end plates 12 and 13, has its bearings 14 and 15 supported on the end plates 12 and 13, respectively, the shaft 16 of the rotor 17 being mounted in these bearings. The motor shown is of the polyphase wound rotor type, the windings 18 being disposed in the core 19, mounted on the spider 21. Slip rings 26, 27, 28, are mounted on and suitably insulated from the shaft 16 and insulatedly spaced from each other. Leads 32, 33, 34, which may pass through the shaft 16, connect suitable points on the winding 18 with the slip rings 26, 27, 28, respectively, through connectors 35, and studs 41, one of these studs being secured to each of the rings.

Mounted on the outer side of the bearing 14, as by being bolted or otherwise secured to a machined part thereof, is an annular supporting plate 45 having a shouldered portion 46 at its periphery. This plate serves to support a plurality of brush rods 47, which pass through the plate and are insulated therefrom and held in place therein by nuts 48, 49, engaging a threaded portion of the rods and bearing against insulation on both sides of the plate. All, or only a portion of, these rods may extend entirely across the three collector rings, a supporting plate 51, preferably of insulating material, being secured to the outer ends of such rods. The outer periphery of the plate 51 is broken, the peripheral surface of the unbroken parts being along the same circle. It will be obvious that this plate 51, which serves to stiffen the outer ends of the brush rods and hold the same rigid, may be of metal and insulated from the brush rods. In the preferable arrangement, only alternate rods are connected to the supporting plate 51.

In the normal operation of the machine, brushes 52 bear on the collector rings. The presence of dust or other foreign matter in the atmosphere may cause a deposit on the rings and the brushes, which may cause serious sparking and unnecessary heating of these contact parts. For the purpose of protecting the collector rings and brushes from dust or other foreign matter and avoiding the defective operation due to the same, a cylindrical casing 53, having a closed outer end, is mounted on the supporting plates 45 and 51. This casing may be in one or more parts, being shown as consisting of a single member adapted to be slipped axially over the collector rings. Swing bolts 54 mounted at the inner edge of this casing pass between projections 56 and 57 at spaced points at the outer periphery of the plate 45, and nuts, engaging against these projections, serve to hold the bolts and the casing in place.

In order to provide a circulation of ventilating fluid through the casing and in and about the collector rings and brushes, fan blades 65 are suitably mounted in position, as by being insulatedly mounted on the outer ends of the studs 41, and, during the operation of the machine, serve to draw air through an opening 67 in the outer end of the casing 45, and to circulate this air about the collector rings and brushes, thus cooling the same. A hood-shaped cover 68, having a downwardly opening inlet 69 which may be provided with a screen, is mounted over the openings 67. The exit from the casing 53 is at the lower portion thereof, through the openings 71. The inlet hood 68 may be filled with horse hair or other filtering material, as indicated at 72, which serves to purify the ventilating currents drawn through the casing and in and about the collector rings and brushes. If desired, the opening 67 at the end of the casing and the discharge openings 71 at the lower part of the casing may be provided with screens.

From the above description, it will be apparent that, as the motor operates, ventilating currents are drawn through the inlet opening 69 and the filtering material, and pass in and about the collector rings and brushes and is discharged through the openings 71, both the inlet and discharge passages being positioned at the lower side of the device and opening downward, thus minimizing the danger of any dust settling within these passages.

In Figs. 4 and 5, the motor illustrated is of the type in which the slip rings are positioned between the rotor core and the bearing. The leads from the rotor winding 18 pass through and are held in place by a retaining collar or ring 74 on the shaft adjacent the spider 21. Each lead is connected to its respective collector ring by any suitable means. Mounted on the inner edge of the bearing 14, preferably through the intermediary of a ring 75 secured by bolts or otherwise to a machined part of the bearing, is an annular supporting plate 78, of approximately U-shape in cross-section. An axially extending flange portion 79 of this plate is secured, as by being bolted, to the ring 75, secured to the bearing 14, and a radially extending portion 81 is secured to and spaced from this flange portion 79 by a recessed portion 82, and is provided with a shouldered portion 83 at its outer periphery. A plurality of brush rods 84 are insulatedly mounted in the radially extending portion 81, the inner ends of the brush rods being secured to a plate 86, either of insulating material or suitably insulated from the brush rods. A collar of packing material 87 may be secured to the radial inner portion of the plate 86, to form a dust proof closure with the collar 74. The plate 86 preferably has a shouldered portion 88 at its outer periphery.

A removable cover 91, preferably in a plurality of parts, rests in the shoulder portions at the outer peripheries of the supporting plates 78 and 86 and may be held in close engagement therewith by a plurality of two-part clamps 89 secured to one of the cover parts and engaging another part to draw it into close engagement with the first, and the whole casing into tight engagement with the shouldered portions 83 and 88. It will be apparent, however, that any other suitable means for accomplishing the same function, may be used instead of the clamps 89. With the cover 91 in place, it will be apparent that the slip rings and brushes are completely inclosed.

To provide a circulation of ventilating fluid in and about the slip rings and brushes, fan blades 66 are mounted on studs 92 and, when the machine is in operation, serve to draw cooling fluid through openings 94 in the radially extending portion 81 of plate 78. These openings may be provided with screens 95. The recessed portion of the plate 78 may be provided with a removable cover 96 extending across from the flanged portion 79 to the radial portion 81 and completely inclosing this recess except at the lower portion thereof, where access to the recess may be had through a screen 97. This recess may be filled with horse hair or other filtering material. The exit of the ventilating fluid from the casing is through the openings 98 in the cover 91, at the lower side thereof.

It will be apparent that, as in the form shown in Figs. 1, 2 and 3, air is admitted through a lower opening and is drawn through a filtering chamber into the protecting casing and is there circulated about the collector rings and brushes and is finally expelled through the openings 98 at the lower side of the casing. The positions of the inlet and exit openings are such as to prevent the settling of any dust through such openings.

While the invention is shown in connection with a polyphase induction motor of the wound rotor type having slip rings, it will be obvious that the same may as well be applied to any dynamo-electric machine provided with either collector rings or a commutator in which it is desirable to protect the current collecting devices from dust or foreign matter and to maintain the same in cool operating condition. The fan means necessary for obtaining the desired flow of cooling fluid may be comparatively small and may occupy a very limited space. The general construction is such that the filtering material may be renewed at any time, and access may be readily had to the current collecting devices for inspection or adjustment.

It should be understood that it is not desired to be limited to the exact details of construction shown and described, for obvious modifications will occur to a person skilled in the art.

It is claimed and desired to secure by Letters Patent:

1. In a dynamo-electric machine having a shaft rotatable in a bearing, current collecting devices comprising relatively movable parts, a protective casing for said current collecting devices comprising a supporting plate secured to the bearing of said machine, rods mounted on said supporting plate, a second supporting plate held in place by said rods, and a cover having a substantially closed end mounted on said supporting plates and secured to said first mentioned supporting plate, said casing being provided with an inlet at one end and an outlet at the lower portion, and fan means within the casing for drawing ventilating fluid through said inlet and about said current collecting devices.

2. In a dynamo-electric machine having a shaft rotatable in a bearing and current collecting devices comprising relatively movable parts, a protective casing for said current collecting devices comprising a supporting plate secured to the bearing of said machine, brush rods secured to said supporting plate and extending across the movable part of said current collecting device, a second supporting plate mounted on said brush rods, and a substantially closed-end cover mounted on said supporting plates, said cover being provided with inlet and outlet, and fan means within said casing for causing the circulation of ventilating fluid about said current collecting devices.

3. In combination in a dynamo-electric machine, a rotatable element provided with a winding, current collecting devices comprising a part of conductive material carried by the rotatable element of said machine, a plurality of leads connected to said winding, spaced supports insulated from each other for terminal portions of said leads, conductive connections between said supports and said rotatable part of the current collecting devices, and fan means mounted on said supports and operative to circulate ventilating fluid about said current collecting devices.

4. In combination in a dynamo-electric machine, a rotatable element provided with a winding, current collecting devices comprising collector rings carried by the rotatable element of said machine, leads connected to the winding on said rotatable element, supports insulated from each other for terminal portions of said leads, conductive connections between said supports and said collector rings of the current collecting devices, a protective casing fixed in position and surrounding said current collecting devices, the winding-carrying portion of said rotatable element being outside of said protective casing, said casing being provided with an inlet and an outlet, and fan means mounted on said supports and operative to circulate ventilating fluid through said casing.

5. In combination in a dynamo-electric machine, a rotatable element provided with a winding, said rotatable element being mounted on a shaft a portion of which is hollow, current collecting devices comprising collector rings carried by said shaft, leads connected to the winding on said rotatable element, a portion of said leads being disposed within the bore of the hollow portion of said shaft, spaced and insulated supports for terminal portions of said leads, conductive connections between said supports and said collector rings, and fan blades mounted on said supports and operative to circulate ventilating fluid about said current collecting devices.

6. In combination in a dynamo-electric machine, stationary and rotatable elements provided with windings, said rotatable element being mounted on a shaft provided with a longitudinal bore, current collecting devices comprising relatively movable parts, movable parts of said current collecting devices being mounted on said shaft, leads connected to the winding on said rotatable element of the machine, spaced and insulated supports mounted on said shaft for terminal portions of said leads, conductive connections between said supports and said movable parts of the current collecting devices, a supporting plate mounted in fixed position adjacent said current collecting devices, a protective casing disposed about said current collecting devices and removably secured to said supporting plate and provided with spaced openings, and fan means mounted on said supports and operative to create a circulation of ventilating fluid through said casing and about said current collecting devices.

7. In combination with a dynamo-electric machine having a current collecting device, a casing inclosing said current collecting device having an outlet, a chambered extension on said casing having an inlet, and an outlet into said casing, a screen over said last named outlet, filter material in said chambered extension, and means for producing a circulation of air through said chambered extension and said casing.

In testimony whereof, the signatures of the inventors are affixed hereto in the presence of two witnesses.

RAE W. DAVIS.
ROBERT B. WILLIAMSON.

Witnesses:
W. H. LIEBER,
ROB. E. STOLL.